United States Patent
Luper (10) Patent No.: US 6,926,636 B2
(45) Date of Patent: Aug. 9, 2005

(54) GEAR DRIVEN POWER CONVERTER

(75) Inventor: Jerry Luper, 8304 Coles Ferry Rd., Lebanon, TN (US) 37087

(73) Assignee: Jerry Luper, Lebanon, TN (US)

( * ) Notice: Subject to any disclaimer, the term of this patent is extended or adjusted under 35 U.S.C. 154(b) by 0 days.

(21) Appl. No.: 10/254,428

(22) Filed: Sep. 25, 2002

(65) Prior Publication Data

US 2004/0058768 A1 Mar. 25, 2004

(51) Int. Cl.$^7$ ............................................. F16H 37/08
(52) U.S. Cl. .................. 475/330; 475/152; 475/218; 475/221
(58) Field of Search .......................... 475/72, 73, 151, 475/152, 215, 216, 217, 218, 221, 329, 330

(56) References Cited

U.S. PATENT DOCUMENTS

| | | | |
|---|---|---|---|
| 1,660,356 A | 2/1928 | Postel | |
| 2,547,453 A | 4/1951 | Egy | 74/679 |
| 3,087,355 A | 4/1963 | Bassereau | 74/793 |
| 3,470,769 A | * 10/1969 | Livesey | 475/24 |
| 3,665,788 A | * 5/1972 | Nyman | 475/12 |
| 3,733,931 A | * 5/1973 | Nyman et al. | 477/69 |
| 3,955,435 A | 5/1976 | Arick | 74/411 |
| 3,979,972 A | * 9/1976 | Sakai et al. | 475/81 |
| 4,112,778 A | 9/1978 | Korosue | 74/117 |
| 4,138,907 A | * 2/1979 | Melles | 475/72 |
| 4,259,881 A | * 4/1981 | Meyerle | 475/72 |
| 4,267,749 A | 5/1981 | Chambers et al. | 74/690 |
| 4,382,188 A | * 5/1983 | Cronin | 475/216 |
| 4,577,527 A | 3/1986 | Shackelford | 74/640 |
| 4,651,592 A | * 3/1987 | Edwards | 475/204 |
| 4,662,245 A | * 5/1987 | Taylor | 475/73 |
| RE33,278 E | 7/1990 | Johnshoy | 475/6 |
| 4,964,322 A | 10/1990 | Reiterman | 82/131 |
| 4,974,471 A | 12/1990 | McGarraugh | 74/713 |
| 4,983,151 A | 1/1991 | Pires | 475/170 |
| 4,994,002 A | * 2/1991 | Valotto et al. | 475/72 |
| 5,108,352 A | 4/1992 | Pires | 475/170 |
| 5,116,292 A | 5/1992 | Han | 475/16 |
| 5,186,692 A | * 2/1993 | Gleasman et al. | 475/72 |
| 5,308,293 A | 5/1994 | Han | 475/18 |
| 5,830,097 A | * 11/1998 | Larkin | 475/72 |
| 5,931,758 A | * 8/1999 | Walter | 475/72 |
| 6,068,570 A | 5/2000 | Han | 475/207 |

* cited by examiner

Primary Examiner—Ha Ho
(74) Attorney, Agent, or Firm—Waddey & Patterson. P.C.; Phillip E. Walker; David B. Pieper (57) ABSTRACT

A differential power coupling for generating forward and reverse motions and allowing stopping of the rotation for a vehicle using a rotational power supply to power a variable speed transmission having first and second outputs. The power coupling uses a rotational outside gear with an outside face coupled to the first power supply, a rotational support body coupled to the second power supply and adapted to rotate axles of differential gears around a central axis, and at least one differential gear rotationally mounted on the axle attached to the rotational support body and coupled to the inside face. The differential gear is further coupled to the output shaft and adapted to create a fully variable rotation of the outputs shaft including forward, reverse and stopped rotation. A method is also described for controlling a rotational speed of an output shaft by converting an input rotation into a first and second rotation, differentiating the first rotation and the second rotation to achieve a third rotation; and transferring the third rotation to the output shaft as a function of the difference.

15 Claims, 5 Drawing Sheets

GEAR DRIVEN POWER CONVERTER

BACKGROUND OF THE INVENTION

The present invention relates generally to variable speed transmissions and more particularly, this invention pertains to a method of variably driving a rotary output from a constant rotary input with a power converter.

Variable speed transmissions are well known in the art. Examples of these are illustrated in the prior art patents including: U.S. Pat. No. 6,068,570 entitled "Variable Speed Transmission System And Differential"; U.S. Pat. No. 5,308,293 entitled "Variable Speed Drive Transmission"; U.S. Pat. No. 5,116,292 entitled "Variable Drive Transmission"; U.S. Pat. No. 5,108,352 entitled "Modified Cranking Mechanism For Epicyclic Transmission"; U.S. Pat. No. 4,983,151 entitled "Transmission Ratio Changing Apparatus And Method"; U.S. Pat. No. 4,112,778 entitled "Variable Speed Power Transmission"; U.S. Pat. No. 3,955,435 entitled "Variable Speed Drive Mechanism"; U.S. Pat. No. 3,087,355 entitled "Constantly Variable Speed Transmission"; U.S. Pat. No. 2,547,453 entitled "Variable-Speed Transmission Device"; and U.S. Pat. No. 1,660,356 entitled "Epicyclic Change Speed Gear."

Of particular note are patents discussing the use of a differential with a variable speed transmission including: U.S. Pat. No. 4,974,471 entitled "Controllable Pinion Differential Device"; U.S. Pat. No. 4,651,592 entitled "Infinitely Variable Speed Drive With Differential Having Two Input Shafts And An Output Gear"; U.S. Pat. No. 4,577,527 entitled "Differential Drive Mechanism"; and U.S. Pat. No. 4,267,749 entitled "Compact Reversible Variable Speed Transmission And Differential." All of these and the aforementioned listed patents are hereby incorporated by reference.

These patents fail to provide a planar power converter for use with a rotary input with a differential speed introduced by a variable speed transmission so that the power converter can convert the speed differential into a power output. What is needed, then, is the power converter of the present invention.

SUMMARY OF THE INVENTION

The present invention is directed to a power converter apparatus and method for converting a continuous rotary input into a fully variable, stoppable, and reversible rotary output. The present invention provides these features with a planar design rotating around a central axis for consistent balance and operation at variable speeds.

In one embodiment, the present invention utilizes a power transfer device for a vehicle that uses a rotational power supply such as an electric motor or internal combustion engine. The power transfer device uses a variable speed transmission that is adapted to convert the rotational power supply into a first power supply and a second power supply. The first power supply and the second power supply always rotate in the same direction while the engine is running. The transmission is used just to control the ratio of the speed of the first and second power supplies to establish a speed difference between the power supplies. Alternatively, one of the power supplies may be the original power supply with the variable transmission only creating one additional output.

The two different speed inputs are sent to a differentiating coupler that uses a rotational outside gear coupled to the first power supply, where the outside gear is adapted to rotate around a first axis. The rotational outside gear includes an inside face that will drive a differential gear. A rotational support body is then coupled to the second power supply so that it can rotate an axle mounted at body mounting location that rotates in a circular pattern around a central axis. The axle is used to support the differential gear. The differential gear is then rotationally mounted on the axle and the differential face of the differential gear is coupled to the inside face of the outside gear. In this manner, the rotation of the differential gear is proportional to a gear ratio coupled speed difference between the rotational outside gear and the rotational support body. An output shaft is then coupled to the differential gear.

In its basic form, the invention utilizes a first rotational body rotated by the first power input at a first speed. The invention also includes a second rotational body adapted to rotate independently of the first rotational body with the second rotational body rotated by the second power input at a second speed. Further, the invention includes at least one rotational comparator body coupled to the first rotational body and the second rotational body such that any speed difference between the first speed and the second speed causes a proportional rotation in the comparator body as the rotational power output.

Additionally, a further object and advantage of the present invention may be found in the method of the present invention that teaches a method for controlling a rotational speed of an output shaft powered by an input shaft having an input rotation. The method includes converting the input rotation into a first rotation, converting the input rotation into a second rotation, differentiating the first rotation and the second rotation to achieve a third rotation, and then transferring the third rotation to the output shaft.

The preferred construction of the present invention and the advantages of the particular configuration and its planar design may be understood by reviewing the detailed description that follows.

DESCRIPTION OF THE PREFERRED EMBODIMENTS

Figure 4:
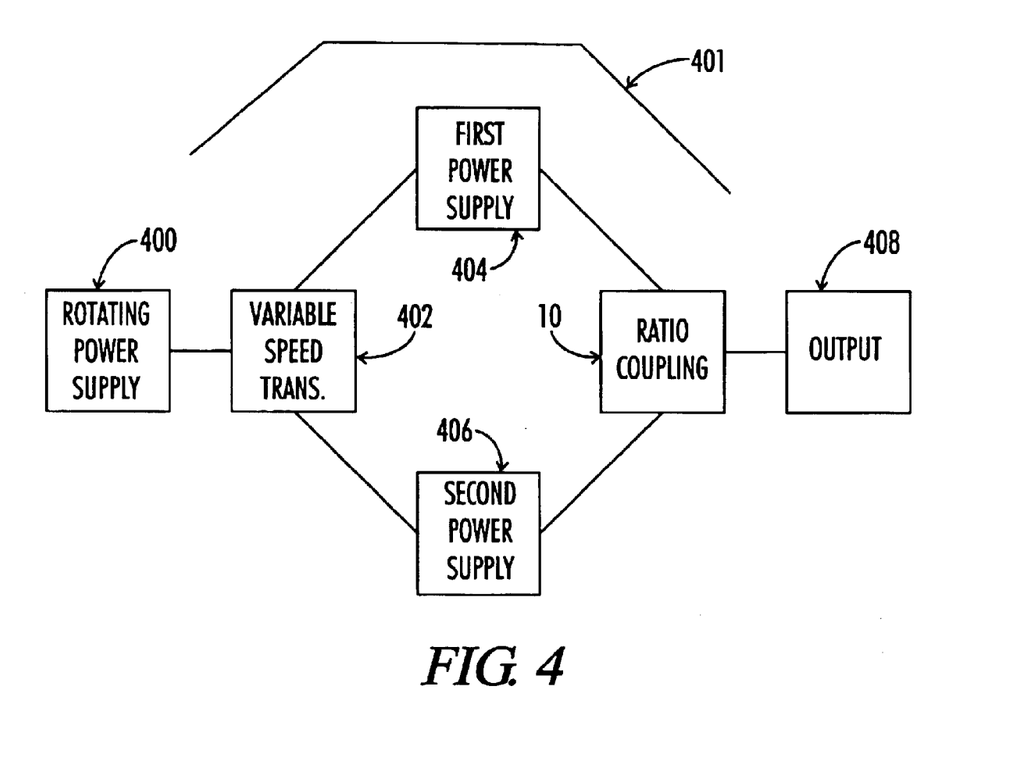
FIG. 4 is a schematic view of the power converter used with a variable speed transmission in a vehicle.

FIG. 4 of the drawings shows an overview of the placement of the power coupling 10 of the present invention in a power transfer apparatus 401, also known as a drive train 401, for a vehicle. The vehicle includes a rotational power supply 400 that is used to drive the vehicle, such as an internal combustion engine, electric motor, hydraulic drive, centrifugal generator or other method of generating rotational power. The present invention provides a drive train 401 from the rotating power supply 400 to the output 408. The drive train 401 begins with a variable speed transmission 402 adapted to convert the rotational power supply into a first power supply 404, also known as a first rotational power input operating at a first speed, and a second power supply 406, also known as a second rotational power input operating at a second speed. This type of variable speed transmission 402 is well known in the art and has many alternative designs. One of the speeds may simply be a pass through of the original rotational speed. Any of these designs may be utilized with the power ratio coupling apparatus 10 of the present invention.

Figure 1A:
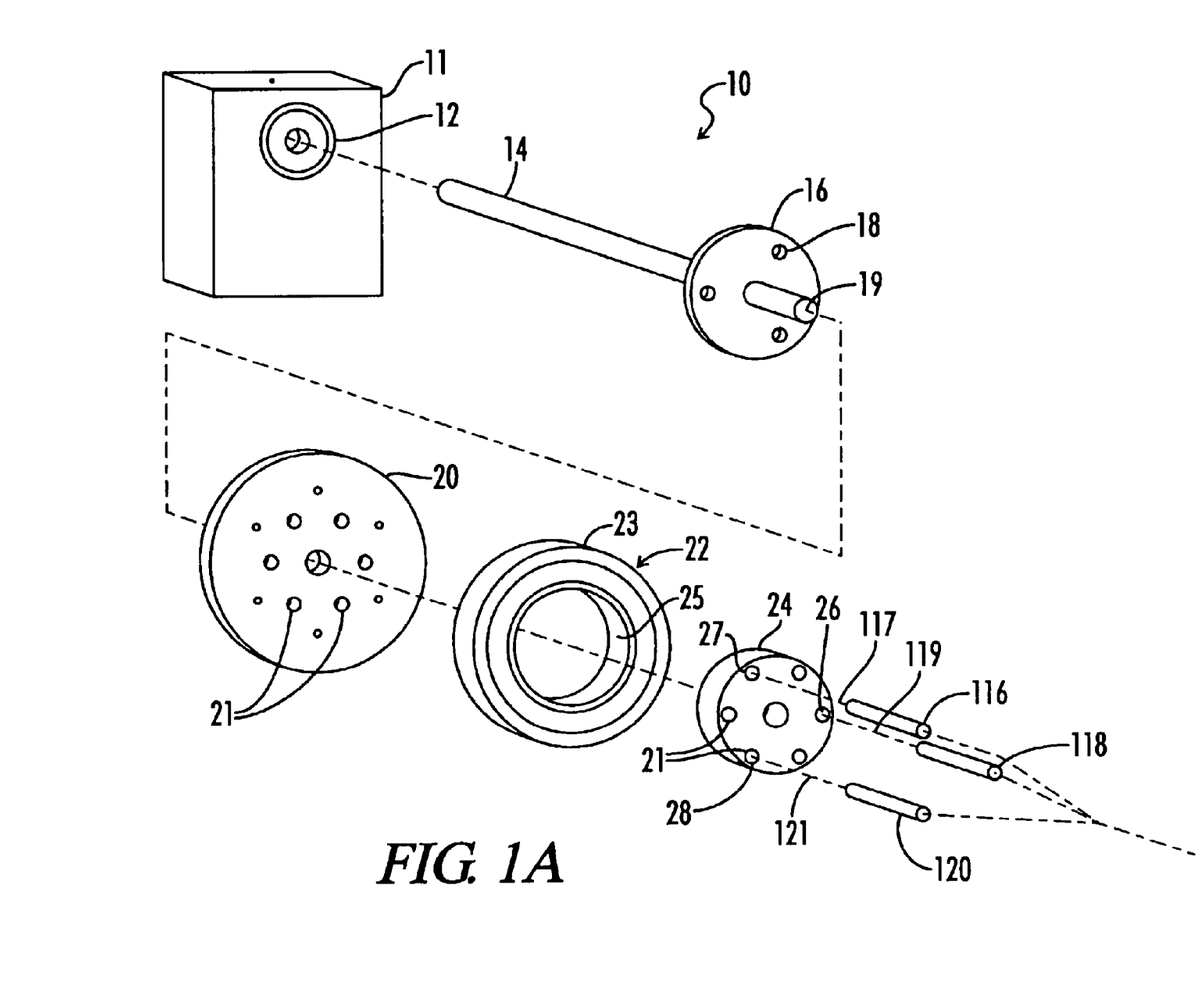
FIG. 1A is an exploded view of the incoming power support for the power converter of the present invention.
Figure 1B:
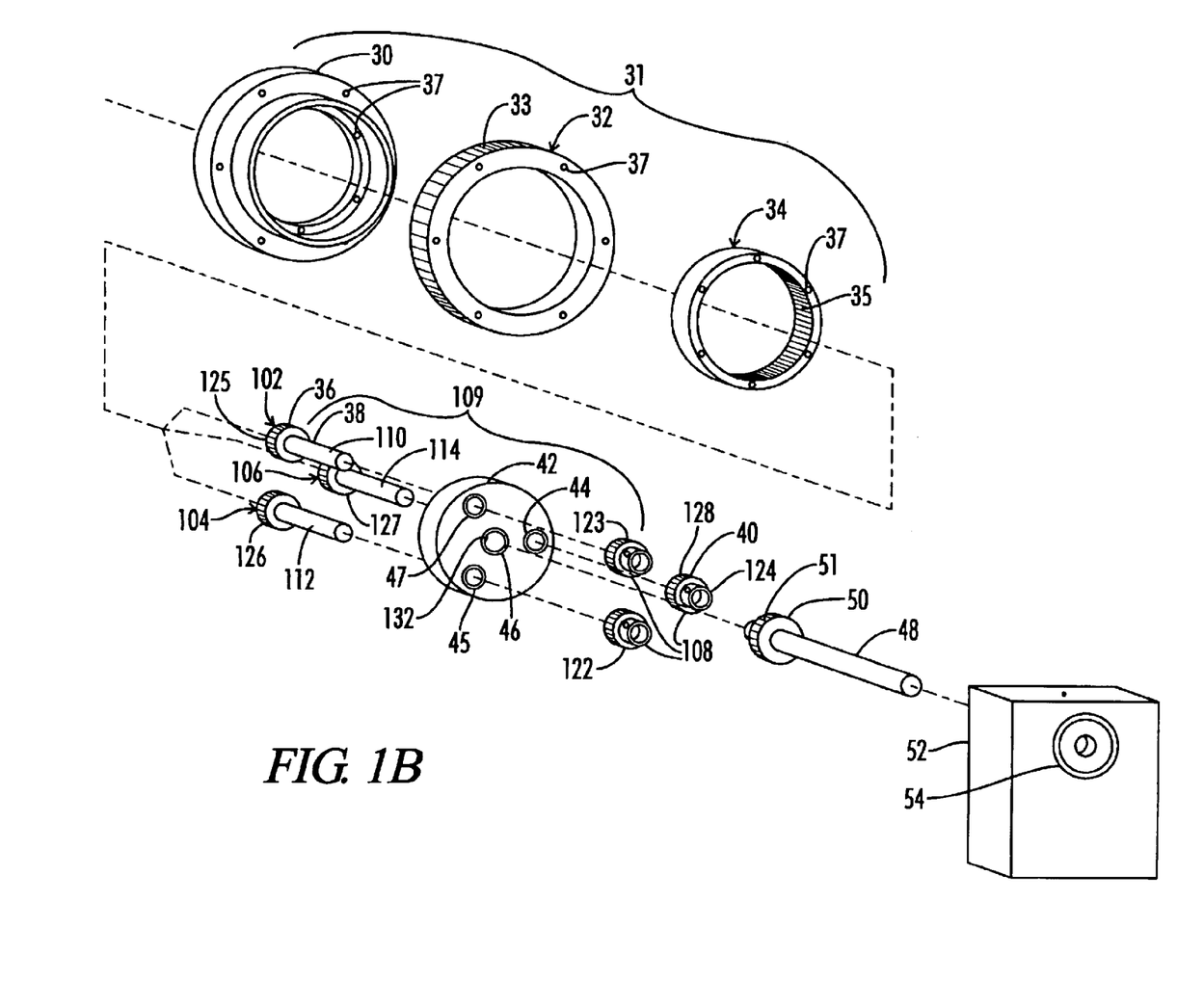
FIG. 1B is an exploded view of the differential portion of the power converter.
Figure 2:
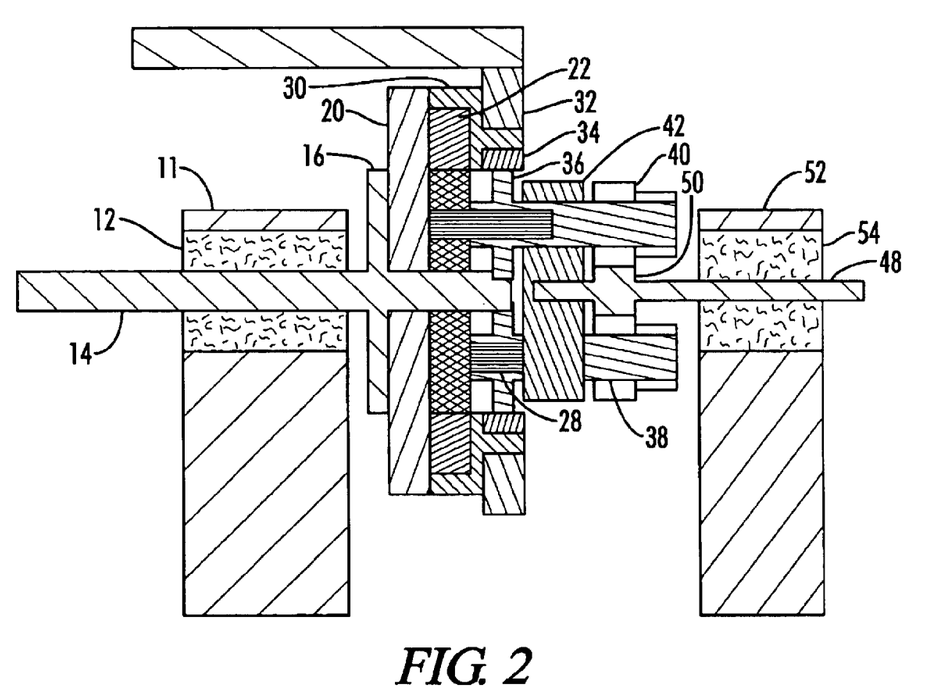
FIG. 2 is a cutaway view down the vertical centerline of the power converter.

FIGS. 1A, 1B, and 2 of the drawings show a preferred embodiment of the ratio coupling apparatus 10, also known as a power coupling 10. The input shaft 14 of the power coupling 10 is supported by an input bearing 12 mounted in an input mounting block 11. The power input shaft 14 is coupled to the second power supply 406 shown in FIG. 4. Returning to FIG. 1, the power input shaft 14 supports an input gear mounting flange 16 with flange bolt openings 18 used to bolt the input gear mounting flange 16 to the gear support plate 20. The gear support plate 20 acts as a support for the differential bearing 22 and a mounting for the rotational mounting support body 24.

The outside race surface 23 of the differential bearing 22 rotatably supports the movement of a first rotational body 31 (FIG. 1B), also known as the rotational outside gear 31. The base of the outside gear 31 is the outside gear ring body 30. The outside gear ring body 30 positions the outside tooth ring 32 having an outside ring face 33 and the inside tooth ring 34 having an inside ring face 35. The outside tooth ring 32 and inside tooth ring 34 are bolted to the outside ring body 30 through outside mounting apertures 37. Power from the first power supply 404 is connectively coupled to the outside face 33. By rotation of the outside face 33 power is transferred through the outside ring body 30 such that the inside face 35 is also rotated.

The outside gear inside ring face 35 is coupled to the inner differential gears 40, also known as rotational comparator bodies 40. As shown in FIGS. 1A, 1B, 2, and 3, the preferred embodiment uses a first differential gear 102, second differential gear 104, and third differential gear 106 to center the position of the output shaft 48, also known as a rotational power output 48.

The differential gears 102, 104, 106 include end gears 108 mounted on elongated rotational supports formed as first, second, and third support shafts 110, 112, 114 that are rotatably mounted over first, second, and third gear support axles 116, 118, 120. Needle bearing may be used for reduced friction. The three gear support axles 116, 118, 120 are mounted in the rotational mounting supporting body 24, also known as the second rotational body 24 and the rotational base 24.

Each differential gear 102, 104, 106 has an input end gear 122, 123, 124 attached to the gear shaft 110, 112, 114 on the first side of the support body 42 and a output end gear 125, 126, 127 attached to the gear shaft 110, 112, 114 on the second side of the support body 42. The output end gears 125, 126, 127 are also known as the output differential gears 125, 126, 127. The differential gear face 109 of each of the output differential gears 125, 126, 127 has a differential tooth set 128 that is coupled to the output shaft's 48 output gear face 50, also known as a shaft face 50 having a shaft tooth set 51. The output shaft 48 is supported to rotate around the first axis 19 by an output shaft bearing 132 placed in the central support aperture 46 of the supplemental support body 42 and a rotational output bearing 54 mounted in the output mounting block 52. In this manner, the difference in speed between the rotational support body 24 and the inside face 35 of the outside gear 31 is transferred to the output shaft 48.

The rotational mounting supporting body 24 is positioned by the inner surface 25 of the differential bearing 22 and the rotational mounting supporting body 24 is also fixed in position by bolting to the gear support plate 20 through connection apertures 21. In this manner, the rotational supporting body 24 is adapted to rotate around the first central rotational axis 19 of the input shaft 14. The gear support axles 116, 118, 120 are each positioned at a corresponding body mounting location 26 at a point distal from the first axis 19. A triangular orientation with equal angular spacing is preferred for this mounting arrangement. Each of the first, second, and third body mounting locations 26, 27, 28 and associated gear support axles 116, 118, 120 defines a parallel distal rotational axis 117, 119, 121 located parallel to but distal from the first axis 19. This provides for rotation of the gear support axles 116, 118, 120 around the first axis 19 by the second power supply 406. In this manner, rotation of the entire differential gear 102, 104, 106 around the first axis 19 is controlled by the second power supply 406.

The differential gears 102, 104, 106 rotate around the first axis 19 at a speed associated with the rotation of the body mounting location 26, 27, 28 around the first axis 19. The differential gears also rotate around their axles 116, 118, 120 because the differential gear faces 109 are coupled to the inside face 35 of the outside gear 31. In this manner, the speed of rotation of the differential gear 102, 104, 106 around the central axis 19 and around their differential axis 117, 119, 121 is controlled by the gear ratio and difference in the rotational gear ratio speed of the inside face 35 of the outside gear 31 and the speed of the body mounting location 26, 27, 28 on the rotational support body 24.

As shown in the preferred embodiment, each differential gear 102, 104, 106 includes a hollow gear support shaft 110, 112, 114 rotationally mounted on a support axle 116, 118, 120 fixed to a main support body 24. Further strength is added by coupling the support shafts 110, 112, 114 through shaft bearings 44, 45, 47 in a supplemental support body 42.

FIGS. 3A through 3D of the drawings show the relationship of gear movement R1, R2, R3, and R4 to create a negative rotation, positive rotation, and no rotation for the output shaft 48 by varying the relative input speeds from the first power supply and the second power supply. This allows for both power supplies to continuously operate and allow for zero, positive, and negative rotation of the output shaft 48 by simply controlling the relative speeds of the two power inputs. This explanation considers clockwise rotation to be a positive rotation.

Figure 3A:
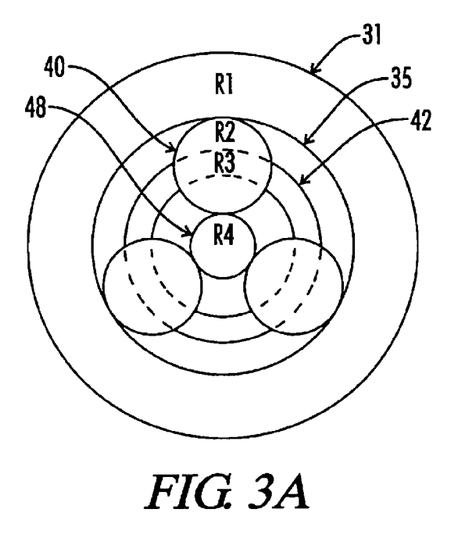
FIG. 3A is a reference position for an explanation of the operation of the outside and differential gears of the power converter.

FIG. 3A shows an initial position that will be used as a basis to show the relative motion and rotation of the outside gear 31 including inside face 35, gear support 42 supporting the axles for the differential gears 102, 104, 106, and output shaft 48 including output gear face 50. Rotation for the outside gear 31 is shown by the movement of R1. Rotation for the gear support 42 is shown by the movement of R2.

Rotation for the differential gears 102, 104, 106 is shown by the movement of R3. Rotation for the output shaft 48 is shown by the movement of R4. The apparatus is intended to be used to change two positive motions into either a negative rotation, zero rotation, or positive rotation output. This allows an engine to constantly run in one direction while allowing the vehicle to be controlled in any direction and at any speed. This conversion of two forward speeds into a totally variable output is shown by the relative rotation in FIGS. 3A, 3B, and 3C.

Figure 3B:
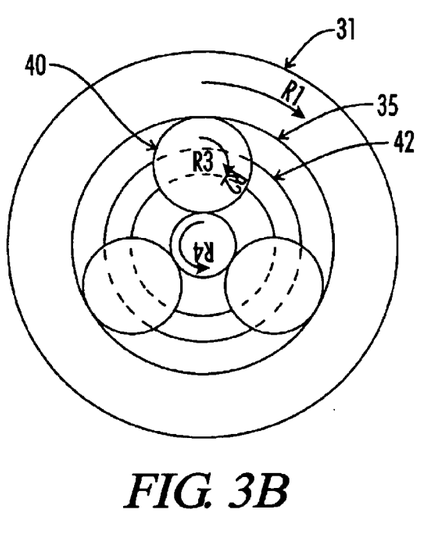
FIG. 3B is a reference position showing how to achieve reverse rotation of the output shaft by controlling the relative forward speeds of the outside and differential gears.

As shown in FIG. 3B, when both gears are rotated, but the outside gear 31 is rotated at a gear ratio speed that is faster than the gear support 42, a speed differential is created as represented by the movement of R1 in relation to gear support 42. This causes the differential gears 102, 104, 106 to positively rotate to create a negative rotation of the output shaft 48. Thus, rotation of both the outside gear and the gear support with a slightly faster rotation of the outside gear 31 will cause a reverse rotation of the output shaft 48.

Figure 3C:
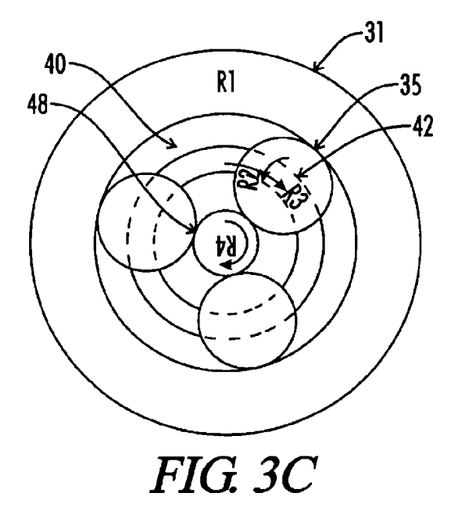
FIG. 3C is a reference position showing how to achieve positive rotation of the output shaft by controlling the relative forward speeds of the outside and differential gears.

FIG. 3C shows how the gear support 42 may be rotated at a gear differential speed that is faster than the outside gear 31 to create a positive rotation of the output shaft 48. When both the outside gear 31 and the gear support 42 are rotated, but the gear support is rotated at a faster gear ration speed, a speed differential is introduced as represented by the movement of R3 in relation to R1. This causes the differential gears 102, 104, 106 to negatively rotate shown by the movement of R2 to create a positive rotation of the output shaft 48 as shown by the movement of R4. Thus, rotation of both the outside gear and the gear support with a slightly faster rotation of the gear support will cause a positive rotation of the output shaft 48.

Figure 3D:
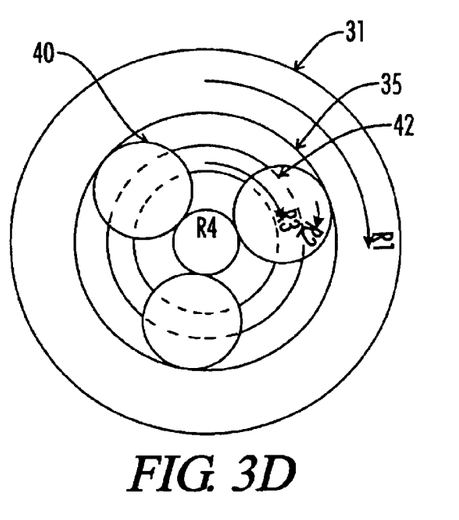
FIG. 3D is a reference position showing how to achieve zero rotation of the output shaft by controlling the relative forward speeds of the outside and differential gears.

Finally, FIG. 3D shows how both the outside gear 31 and the gear support 42 may be rotated at the gear ratio speed so that the differential gears 102, 104, 106 may simply rotate around the face 50 of the output shaft 48 without causing any rotation of the output shaft 48. In this zero-rotation configuration, the outside gear 31 and the gear support 42 are rotating in a matched gear ratio relationship so that the gears do not provide a differential. From this, it may be seen that by controlling the relative forward gear ratio rotation of the outside gear 31 and the gear support 42 each of the positive, negative and zero rotation outputs may be achieved from these forward only inputs.

In this manner, methods are disclosed for controlling a rotational speed of an output shaft powered by an input shaft from a rotating power supply having an input rotation. The methods operate by converting the input rotation into a first and second rotation which operate as first and second power supplies. The method then continues by differentiating the first rotation and the second rotation to achieve a third rotation, and then transferring the third rotation to the output shaft.

Numbers and corresponding descriptions used in this application are as follows:

ratio coupling apparatus 10, also known as power coupling 10
input mounting block 11
input bearing 12
input shaft 14
input gear mounting flange 16
flange bolt openings 18
first central rotational axis 19
gear support plate 20
connection apertures 21
differential bearing 22
outside race surface 23
main rotational mounting support body 24, also known as second rotational body 24,
also known as rotational base 24
inner surface 25
first body mounting location 26
second body mounting location 27
third body mounting location 28
outside gear ring body 30
first rotational body 31, also known as rotational outside gear 31
outside tooth ring 32
outside ring face 33
inside tooth ring 34
inside ring face 35
outside mounting apertures 37
inner differential gears 40, also known as rotational comparator bodies 40
supplemental support body 42
first shaft bearing 44
second shaft bearing 45
central support aperture 46
third shaft bearing 47
output shaft 48, also known as rotational power output 48
output gear face 50
shaft tooth set 51
output mounting block 52
rotational output bearing 54
first differential gear 102
second differential gear 104
third differential gear 106
end gears 108
differential gear faces 109
first hollow gear support shaft 110
second hollow gear support shaft 112
third hollow gear support shaft 114
first gear support axle 116
first parallel distal rotational axis 117
second gear support axle 118
second parallel distal rotational axis 119
third gear support axle 120
third parallel distal rotational axis 121
first input end gear 122
second input end gear 123
third input end gear 124
first output end gear 125, also known as first output differential gear 125
second output end gear 126, also known as second output differential gear 126
third output end gear 127, also known as third output differential gear 127
differential tooth set 128
first side 129
second side 130
output shaft bearing 132
rotational power supply 400 power transfer apparatus 401, also known as drive train 401 variable speed transmission 402 first power supply 404 second power supply 406 output 408

Thus, although there have been described particular embodiments of the present invention of a new and useful Gear Driven Power Converter, it is not intended that such references be construed as limitations upon the scope of this invention except as set forth in the following claims.

What is claimed is:

1. A power transfer apparatus for a vehicle including a rotational power supply, the apparatus comprising:
    a variable speed transmission adapted to convert the rotational power supply into a first power supply and a second power supply;
    a rotational outside gear coupled to the first power supply and adapted to rotate around a first axis, the rotational outside gear including:
        an inside face,
        a gear body defining the inside face, the gear body further defining an outside face;
        an outside tooth ring fixably positioned on the outside face of the gear body; and
        an inside tooth ring fixably positioned on the inside face;
    a rotational support body coupled to the second power supply and adapted to rotate around the first axis, the rotational support body including at least one body mounting location distal from the first axis,
    at least one differential gear rotationally mounted at the at least one body mounting location, the differential gear including a differential face coupled to the inside face, wherein rotation of the differential gear at the at least one body mounting location is proportional to a speed difference between the rotational outside gear and the rotational support body;
    an output shaft adapted to rotate around the first axis, the output shaft including a shaft face coupled to the differential face of the differential gear;
    wherein the power transfer apparatus includes only mechanical gearing positioned on parallel shafts;
    wherein the support body includes a main support body and a supplemental support body, the supplemental support body defining a first side and a second side; and
    wherein the differential gear comprises:
        a gear axle mounted to the main support body;
        a gear shaft rotatably mounted on the gear axle and passing through the supplemental support body;
        a first end gear attached to the gear shaft on the first side of the supplemental support body; and
        a second end gear attached to the gear shaft on the second side of the support body.

2. The apparatus of claim 1, wherein the outside tooth ring is positioned parallel to the inside tooth ring.

3. The apparatus of claim 1, the rotational support body comprising:
    a first body mounting location;
    a second body mounting location;
    a third body mounting location, wherein the first, second, and third body mounting location are equi-angularly spaced around the output shaft.

4. The apparatus of claim 1, further comprising:
    an output mounting block including a rotational bearing supporting the output shaft.

5. A compact rotational power coupling apparatus for converting a first rotational power input and a second rotational power input to a rotational power output along an output shaft, the rotational power coupling apparatus comprising:
    a first rotational body rotated by the first power input at a first speed, the first rotational body including a first gear including an inside face and a first outside face;
    the first gear comprising:
        a ring body;
        an outside ring face fixed to the ring body; and
        an inside ring face coupled to the ring body;
    a second rotational body adapted to rotate independently of the first rotational body, the second rotational body rotated by the second power input at a second speed;
    at least one rotational comparator body coupled to the first rotational body, the output shaft, and the second rotational body such that any speed difference between the first speed and the second speed causes a proportional rotation in the comparator body as the rotational vower output; and
    wherein the second rotational body rotates about the comparator body and the output shaft.

6. The apparatus of claim 5, the second rotational body comprising:
    a rotational base defining a central rotational axis and at least one distal rotational axis.

7. The apparatus of claim 6, the rotational comparator body comprising:
    at least one elongated rotational support coupled to the rotational base at the distal rotational axis.

8. The apparatus of claim 7, the rotational comparator body further comprising
    a rotational support body defining a central aperture and a differential face, the central aperture adapted to mount the central rotational axis on the rotational support body, and the differential face is coupled to the first gear.

9. The apparatus of claim 6, further comprising:
    an output shaft rotationally mounted along the central rotational axis, the output shaft including a shaft face coupled to the differential face.

10. A power coupling apparatus for a vehicle adapted to selectively and controllably transfer a rotational power input to a rotational output shaft, the power coupling comprising:
    a first variable transmission adapted to convert the rotational power input to a first power input and a second power input;
    a first gear coupled to the first power input, the first gear including an inside tooth set;
    a mounting body coupled to the second power input and adapted to rotate around a first axis, the mounting body including at least one mounting location defining a distal second axis rotating around the first axis;
    at least one second gear rotationally mounted to the mounting body at the second axis and coupled to the first gear, the second gear coupled to the rotational output shaft to rotate the output shaft as a ratio of the speed difference between the first gear and the mounting body, the second gear including a differential tooth set coupled to the inside tooth set;

wherein the first gear rotates about the second gear; and wherein the output shaft is adapted to rotate around the first axis, the output shaft defining a shaft tooth set coupled to the differential tooth set.

11. The apparatus of claim 10, the transmission adapted to rotate the first gear at a first speed and the mounting body at a second speed such that zero rotation is achieved on the rotational output.

12. The apparatus of claim 11, transmission adapted to rotate the first gear at a higher speed than the mounting body such that a first direction of rotation is achieved on the rotational output.

13. The apparatus of claim 12, the transmission further adapted to rotate the first gear at a lower speed than the mounting body such that a second direction of rotation is achieved on the rotational output.

14. The apparatus of claim 10, wherein the ratio is matched.

15. The apparatus of claim 10, the at least one second gear including a first inner gear, a second inner gear, and a third inner gear adapted to position the rotatable output shaft on the first axis.

* * * * *